United States Patent [19]
Yoshiwara et al.

[11] Patent Number: 4,831,708
[45] Date of Patent: May 23, 1989

[54] METHOD FOR PRODUCING A CLAD PLATE BY HOT ROLLING

[75] Inventors: Seishiro Yoshiwara; Takao Kawanami, both of Kitakyushu; Kenichi Suzuki, Kawasaki; Yukihiro Kako, Kitakyushu, all of Japan

[73] Assignee: Nippon Steel Corporation, Tokyo, Japan

[21] Appl. No.: 218,476

[22] Filed: Jul. 6, 1988

Related U.S. Application Data

[63] Continuation of Ser. No. 848,696, Apr. 4, 1986, abandoned.

[30] Foreign Application Priority Data

| Apr. 5, 1985 | [JP] | Japan | 60-72381 |
| Apr. 10, 1985 | [JP] | Japan | 60-75591 |
| Apr. 10, 1985 | [JP] | Japan | 60-75592 |
| Dec. 28, 1985 | [JP] | Japan | 60-299283 |
| Dec. 28, 1985 | [JP] | Japan | 60-299286 |

[51] Int. Cl.⁴ ............................................. B23K 20/04
[52] U.S. Cl. ......................................... 29/423; 29/458; 29/460; 29/DIG. 32; 29/DIG. 48; 228/158; 228/159; 228/162; 228/190; 228/235; 228/263.16
[58] Field of Search ............ 29/423, 424, 458, 460, 29/505, 527.2, 527.4, 527.7, DIG. 32, DIG. 48; 228/190, 186, 159, 162, 243, 235, 263.16, 158

[56] References Cited

U.S. PATENT DOCUMENTS

| 2,786,265 | 3/1957 | Keay, Jr. | 228/235 X |
| 2,932,885 | 4/1960 | Watson | 228/235 X |
| 2,961,761 | 11/1960 | Watson et al. | 228/235 X |
| 3,348,284 | 10/1967 | Gallet et al. | 29/423 |
| 3,667,107 | 6/1972 | Anderson | 29/423 |
| 3,827,264 | 8/1974 | Miller | 29/424 |
| 3,912,152 | 10/1975 | Forand, Jr. | 228/235 X |
| 3,938,723 | 2/1976 | Slaughter | 29/423 |
| 4,478,662 | 10/1984 | Canellos | 29/423 |
| 4,616,393 | 10/1986 | Beuregard et al. | 29/423 |

FOREIGN PATENT DOCUMENTS

| 56-122681 | 9/1981 | Japan . | |
| 109587 | 7/1982 | Japan | 228/158 |
| 1443010 | 7/1976 | United Kingdom | 228/235 |

*Primary Examiner*—Joseph M. Gorski

[57] ABSTRACT

In a method for producing a clad plate by rolling an improvement comprises: a base material, a cladding material, and a cover material overlaid one on another to form a multi-layer structure, and after cleaning joining surfaces of the materials, the cover material is welded to the base material along the periphery thereof, thereby sealing and fixing the cladding material between the cover material and base material, and forming a multi-layer assembly. A member for preventing warp is overlaid over an outer surface of the cover material via a separating agent, and the member for preventing warp and the base material are fixed to one another by welding along the periphery thereof, thereby forming a blank for rolling. The blank is hot-rolled, a rolled article is cut along its periphery to separate the means for preventing warp, and subsequently, the cover material is removed by machining, grinding, or pickling.

36 Claims, 4 Drawing Sheets

METHOD FOR PRODUCING A CLAD PLATE BY HOT ROLLING

This application is a continuation, of application Ser. No. 848,696 filed Apr. 4, 1986 now abandoned.

BACKGROUND OF INVENTION

1. Field of the Invention

The present invention relates to a method for producing a metal clad plate by hot-rolling. The present invention uses relatively inexpensive high-strength materials, for example, steel or copper alloy, as the base material, and as the cladding materials, uses metallic materials having a special function, such as stainless steel, iron-based superalloy, nickel-based superalloy, cobalt-based superalloy, nickel or its alloy, titanium or its alloy, zirconium or its alloy, aluminum or its alloy, copper or copper alloy, or the like. The products may be single clad or multiple clad.

2. Description of the Related Arts

In the production of a clad plate by hot-rolling, the bonding boundary is contaminated by oxide, carbide or non metallic inclusions, which cause bonding between the base metal and the cladding material to become difficult, or which make it difficult to obtain a satisfactory bonding strength even if the bonding is attained.

Japanese Unexamined Patent Publication No. 56-122681 discloses a cladding method using titanium- or titanium-alloy-cladding material, in which the composition of the steel-base material is adjusted such that the carbon content is 0.07 wt. % or less and a carbon-fixing element is added. Alternatively, a steel sheet having the composition similar to the base steel material is inserted between the cladding material and base material. The proposed method could, at the cladding material position, reduce the amount of carbon diffusing from the base material to cladding material. Nevertheless, oxide, carbide, and nonmetallic inclusions were detected at an appreciable amount exceeding the permissible limit on the bonding boundary region of the clad plates when the applicant produced steel sheets by the above publication method.

SUMMARY OF THE INVENTION

The first object of the present invention is to provide a method for producing a clad plate having a high bonding strength.

The second object of the present invention is to provide a method for producing a clad plate by rolling, which allows a lessening of the warp of a clad plate during or after the rolling.

The third object of the present invention is to provide a clad plate-producing method which attains an improved accuracy in the sheet thickness of a clad plate, and which, during the straightening, results in neither buckling of a clad plate nor destruction of the bonding portion of a clad plate.

The fourth object of the present invention is to provide a clad plate-producing method which promotes separation of the warp-preventing material from a clad plate.

In accordance with the present invention there is provided a method for producing a clad plate by rolling characterized in that a base material, a cladding material, and a cover material are overlaid one upon the other to form a multi-layer structure, after cleaning the joining surfaces of these materials, the cover material is welded with the base material along periphery thereof, thereby sealing and fixing the cladding material between the cover material and base material, and forming a multi-layer assembly, a material for preventing warp is overlaid over an outer surface of the cover material via a separating agent, the member for preventing warp and the base material are fixed to one another by welding along the periphery thereof, thereby forming a blank for rolling; the blank is hot-rolled, a rolled article is cut along its periphery to separate the material for preventing warp, and subsequently, the cover material is removed by machining, grinding, or pickling.

The present invention is hereinafter described with reference to the drawings.

BRIEF DESCRIPTION OF THE DRAWINGS

FIG. 1 through 5 illustrate an embodiment of the present invention, in which the base material and cladding material are directly bonded, in which FIGS. 1 and 2 show steps of assembling a blank for rolling, and FIGS. 3 through 5 show the completed assembly;

FIGS. 6 through 9 illustrate an embodiment of the present invention, in which the cladding material is enclosed tightly within the cover material and is bonded with the base material via the cover material, in which FIGS. 6 and 7 show steps of assembling a blank for rolling, and FIGS. 8 and 9 show the completed assembly;

DESCRIPTION OF THE PREFERRED EMBODIMENTS

Figure 1:
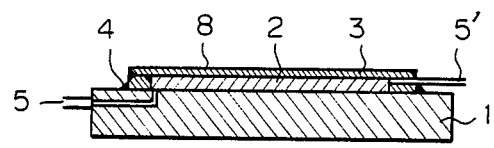

The technical solutions according to the present invention, and the effects thereof involve the following aspects.

(1) According to solution (1), the base material, cladding material, and cover material are overlaid one upon the other to form a multi-layer structure, the base material and cover material are welded to one another along the periphery thereof, and the cladding material is sealed and fixed between the base material and cover material. A bonding-destined surface and a separation-destined surface are situated in spaces which are completely isolated from one another. Accordingly, the bonding-destined surface can be protected from being contaminated by the separating agent, oxide, or gas containing an element detrimental to bonding, during the entire working process including the welding of a blank, transporting, heating, and rolling. Since the cladding material is fixed to the base material by the cover material, and further, the peripheral covering material is rigidly welded and fixed to the base material, it is possible to prevent both displacement of the cladding material and rupture of the cover material, which lead to a nonuniform deformation of the cladding and cover materials and thus impair the dimensional accuracy of the cladding material.

The cleaning of the contact surfaces of the cover material and cladding material is intended to utilize the effect of solution (1) as described above, to the greatest degree, and also is intended to attain a satisfactory bonding by removing from the space, in which the cladding material is situated, as much as is industrially possible of any component deterimental to the bonding. Both surfaces of cladding material are thus completely joined with the cover and base materials and the cladding material is rolled while being satisfactorily restrained therebetween. As a result, warp can be prevented and a uniform deformation can be attained.

(2) A blank for rolling is assembled by the procedures of: cleaning the joining surfaces of the base material, cladding material and cover material to degree that will enable them to be joined; overlaying a warp-preventing material, via a separating agent, upon the multi-layer structure obtained the solution (1), above; and welding the base material and the warp-preventing material to one another along their periphery. Alternatively, a blank for rolling is assembled by the procedures of: preparing a pair of the multi-layer structures having virtually the same dimensions by the solution (1), above; interposing a separating agent between the outer surfaces of the cover materials of a pair of the multi-layer structures; joining the pair via the separating agent, and welding the pair of base materials to one another along their periphery.

When solution (2) is used, the blank for rolling does not warp during heating, rolling, and cooling, or during heat treatment. Accordingly, the operation problems in a rolling mill and heat treatment furnace caused by warp do not occur. In addition, a uniform working is attained so that the dimensional accuracy is improved and the bonding strength is enhanced, since the blank is subjected to neither forcible bending nor unbending. The warp-preventing material desirably has the same composition and dimension as the separation-destined surface of the base material. The thickness of the warp preventing material can be decreased to one third of the thickness of the base material by utilizing the difference in cooling speeds between the base material and the warp preventing material, if these materials are of the same kind. It is not preferable to make the warp-preventing material thicker than the base material, since the cost is thereby enhanced. Most desirably, instead of the warp-preventing material, a multi-layer structure obtained by solution (1) is used, in such a way that this one structure having virtually the same dimension as the other multi-layer structure is joined with the other multi-layer structure via the cover material, and a pair of the multi-layer structures are fixed by welding a pair of the base materials. In this case, two clad plates are simultaneously produced.

(3) The welding of the base material and cover material along their periphery is carried out, after cleaning and joining the surfaces of the base material, cladding material, and cover material. The welding of base material and cover material is performed while blowing inert gas, such as argon or helium, inbetween the base material and cover material so as to provide a seal therebetween. The interior space between the base material and cover material therefore is not contaminated with welding spatter, fumes and heat. Upon completion of the seal welding, the surface of cover material, which is thinner than the base material, is heated to 100° C. or higher, and the space between the base material and cover material is evacuated to attain a pressure of $10^{-1}$ torr or less during heating, so as to remove by suction moisture and volatile components detrimental to bonding, from the space. The heating temperature should be higher than the boiling point of water, so as to effectively remove the moisture, but need not to be higher than the rolling temperature. The gaseous components detrimental to bonding can be economically and effectively removed by suction when the reduced pressure of $10^{-1}$ torr or less is maintained by utilizing welding heat until the completion of welding of a base material with the warp-preventing material or another base material.

(4) The surface of the cover material opposite to the cladding material is a separation-destined surface, to be separated from the warp-preventing material or the other cover material of a pair of multi-layer structures. The cover material should be easily separated from the warp-preventing material via the separation-destined surface, after the hot-rolling. In order to facilitate the separation, a 30 μm or less thick oxide layer is formed on at least one of the surfaces to be joined, i.e., the surface of a cover material to be joined and the surface of a warp preventing material or the other cover material. Alternatively, a powder mainly comprising at least one of $Al_2O_3$, $SiO_2$, $TiO_2$, $Cr_2O_3$, $Fe_2O_3$, and $Fe_3O_4$ is applied on the at least one surface, using resin as a vehicle for the powder, to a thickness of 10 μm or more. The resin as the vehicle has an excellent coating property but generates a large amount of gas during heating. Therefore, the separation-destined surface is desirably communicated with the ambient air to allow the gas to be exhausted. The metals located at both sides of the separation-destined surface are subjected to at least one alternating leveler straightening at the work-hardening temperature of the metals, e.g., 600° C. or less for the steels, to promote the fracture thereof at the regions adjacent to the separation-destined surface. The fracture advances to the rear, i.e., in the direction opposite to the forward direction of the workpiece of the leveler straightening, enlarging the fracture. Therefore, at least one alternating leveler straightening is desirable to broaden the fracture over the entire separation-destined surface.

(5) The materials of the clad rollings as described hereinabove are not specifically limited. Preferably, the metallic materials for the base material are the relatively inexpensive and have a high strength, for example, steel and its alloy. Preferably, the cladding materials are stainless steel, iron-based superalloy, nickel-based superalloy, cobalt-based superalloy, titanium or its alloy, zirconium or its alloy, aluminum or its alloy, and copper or its alloy.

(6) The cladding material may have a multi-layer structure formed by merely overlaying layers of the cladding material or by preliminarily bonding the layers. The cladding material may be bonded on both surfaces of the base material. Each of the cladding material and base materials may have a multi-layer structure.

Referring to FIG. 1, an intermediate step of producing a blank for rolling by assembling the sheet materials is shown. The cladding material 2 is overlaid on the base material 1. The cover material 3 is preliminarily subjected to welding to attach lugs on the circumferential part thereof. The cover material 3 is overlaid on the cladding material 2 and is fixed to the base material 1 by the fillet welding 4. The cladding material 2 is contained in the space formed by the cover material 3 and the base material 1. Nozzles 5 and 5' are provided for blowing, during the fillet welding, an inert gas such as argon or helium through one of the nozzles 5 and 5'. When the cladding material does not consist of an active metal, argon and helium, which are expensive, can be substituted by nitrogen and carbon dioxide gas, which are less expensive.

Figure 2:
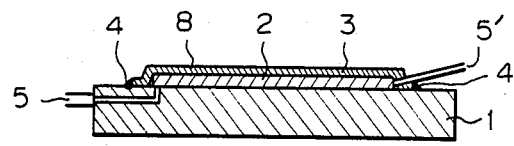

In FIG. 2, the end of the cover material 3 is bent and is fillet-welded to the base material 1. The other procedures are the same as in FIG. 1.

The multi-layer structures shown in FIGS. 1 and 2 are later further subjected to the welding and fixing of the warp-preventing material on the circumference thereof. Where the multi-layer structures are provided with a pair of the nozzles 5, 5', during the fillet welding, preferably, the nozzle 5' is closed, the surface of cover material is heated to 100° C. or higher, and the gas is exhausted through the nozzle 5 to attain a reduced pressure of $10^{-1}$ torr or less.

Figure 3:
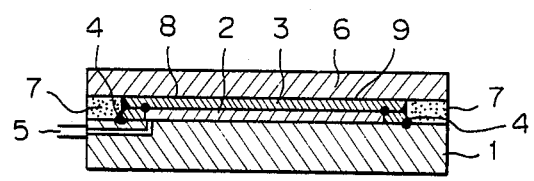

The warp-preventing material 6 can be faced to the multi-layer structure of FIG. 1, for example, as shown in FIG. 3. The base material 1 and warp-preventing material 6 are welded (7) therebetween. Preferably, during the welding 7, the pressure reduction to attain $10^1$ torr or less is continuously carried out by utilizing the nozzle 5 and the welding heat. A blank for rolling is produced by the above described procedure and is heated to a predetermined temperature followed by hot-rolling. The rolled article is cut, so that the warp-preventing material is separated therefrom. The cover material 3 is removed by machining, grinding or polishing, to expose the surface of the cladding material 2, and the clad plate is thus obtained.

Figure 4:
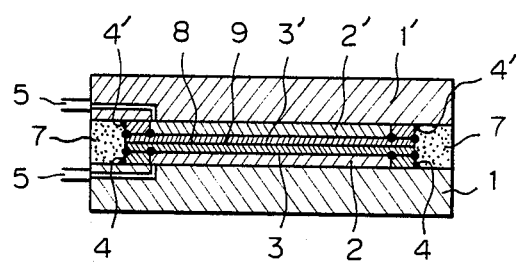

In an embodiment of the present invention shown in FIG. 4, a pair of the multi-layer structures shown in FIG. 1 are joined via an oxide layer 9 formed on at least one of the joining surfaces. The oxide layer can be formed by preliminarily oxidizing the joining surface(s) to a thickness of 30 μm or more, or by applying the powder of any one or more of $Al_2O_3$, $SiO_2$, $TiO_2$, $Cr_2O_3$, $Fe_2O_3$, and $Fe_3O_4$, with resin as the vehicle, to a thickness of 10 μm or more, and then drying. The base material 1 and 1' are welded (7) to one another therebetween, preferably during the pressure reduction through the nozzles 5 to attain $10^1$ torr or less. The base material 1 and 1' have the function of warp prevention in the embodiment shown in FIG. 4.

Figure 5:
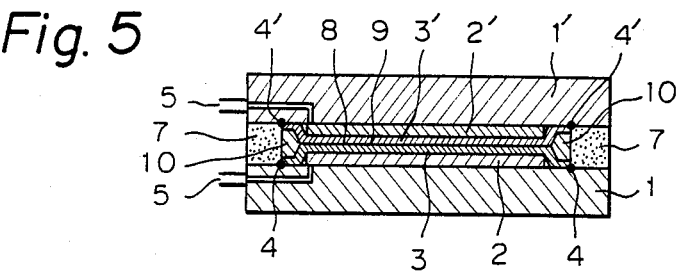

The embodiment illustrated in FIG. 5 is the same as that shown in FIG. 4 except that the multi-layer structure shown in FIG. 2 is used, and further, a distant piece 10 is inserted between the cover materials 3 to prevent their destruction due to the welding.

The blanks for rolling shown in FIGS. 3, 4, and 5 are subjected to forge welding or fusion welding for closing the nozzles 5, while the pressure reduction to $10^1$ torr or less is continued through the nozzles 5. After this, the blanks are heated and then hot-rolled.

After the hot-rolling, the rolled article is cut and separated between the cover materials 3, 3'. The cover materials 3, 3' are then removed by machining, grinding or pickling to expose the cladding material. Two clad plates are obtained from each cut section.

(7) Where the cladding material is active, such as titanium or zirconium, the cover material, which covers and seals the cladding material most preferably has a carbon content of 0.01% or less, so that the cladding material is shielded from the base steel material, the carbon content of which is relatively high. The carbide formation in the cladding material does not occur, in this case, irrespective of the relatively high carbon content of the base steel material. In addition, it is possible to enhance the carbon content of the base steel material, thereby enhancing its strength.

The cover material is most appropriately made of carbon steel free of alloying elements since it is inexpensive and easily formed. An alloying element may be however contained in the steel provided that its carbon content is 0.01% or less. The thickness of a cover steel sheet after the roll finishing is determined from its sheet strength required during assembling a blank, and also the distance of carbon diffusion during the rolling. The thickness mentioned above is desirably 0.1 mm or more, which is the distance of carbon diffusion mentioned above. The thickness of a cover steel sheet, when a blank is assembled, is therefore equal to the thickness after the rolling finishing, multiplied by the roll-reduction ratio, i.e., 0.1×total thickness of a blank/total thickness of a finished article (mm). A foil or plating layer is inappropriate as the cover steel material.

In the present invention, a blank for rolling is heated to 900° C. or less and then roll-bonded, thereby suppressing any movement of the carbon of the cover steel sheet into the cladding material, during heating, to form a carbide therein. When the heating temperature exceeds 900° C., the carbon or carbide in the cover material vaporizes toward or diffuses into the cladding material, with the result that prominent carburization of the cladding material occurs. This impairs the bending or shear properties of clad products.

The heating temperature desirably exceeds the recrystallization temperature, i.e., 650° C., of the materials in the light of the deformation energy required for rolling.

(8) In the present invention, the space defined by the cover material and cladding material is sealed, while reducing pressure in this space to a pressure of $10^1$ torr or less and heating the surface of cover material, e.g., steel sheet, to 100° C. or higher. Organic materials, which can feed carbon to the cladding material during the heating for rolling, therefore can be removed from the space defined by the cover material and cladding material. The carbide-formation content of the cladding material therefore can be lessened.

In the present invention, the cladding material is fixed to the base material by means of the cover material, and the cover material is fixed to the base material by welding the circumference of the cover material. This prevents a displacement of the cladding material, rupture of the cover material, and nonuniform deformation of these materials from occurring during their working. Since the dimensional accuracy of a clad plate is impaired by the nonuniform deformation, the fixing method according to the present invention is effective for enhancing the dimensional accuracy of a clad plate.

In order to attain the highest such effect, the joining surfaces of the cover steel-sheet and cladding materials are satisfactorily cleaned for joining, and any component detrimental to the joining is removed as much as industrially possible from the space where the cladding material is present. Therefore, both surfaces of the cladding material can be joined with the opposite materials and the cladding material is rolled while being thoroughly restrained. This prevents warp and attains a uniform deformation.

Hereinafter is described a method for assembling a blank, wherein the cladding material is sealed in the cover material.

Figure 6:
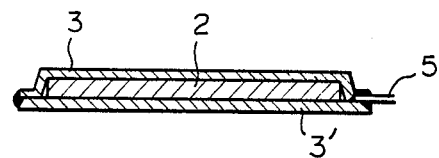

Referring to FIG. 6, an intermediate step of assembling a roll blank is illustrated.

The cladding material 2 is cleaned, and the surface of the cover material to be brought in contact with the cladding material 2 is cleaned. The cover material is, in this embodiment, two cover steel sheets 3, 3' having a carbon content of preferably 0.01 wt % or less. The cover steel sheets 3, 3' are overlaid on the cladding material 2 to form a multi-layered structure. The cover steel sheets 3, 3' are welded to one another along the four peripheral ends thereof. Thus, the cladding material 2 is sealed inside the cover steel-sheets 3, 3'. Inert gas, such as argon or helium, or a non-oxidizing gas such as nitrogen or carbon dioxide gas, is desirably blown through the nozzle 5, to prevent contamination of the cladding material 2 and cover steel-sheets 3, 3', with the fume and spatter of welding. After welding the four peripheral ends of the cover materials 3, 3', the nozzle 5 is closed. Before closing the nozzle 5, it is preferred that the surfaces of the cover steel-sheets 3, 3' are heated to 100° C. or higher and the pressure in the space formed by the cover steel-sheets 3, 3' and cladding material 2 is reduced to $10^1$ torr or less while the heating mentioned above is continued. The heating of the surfaces of the cover steel-sheets 3, 3' is effective for removing moisture and organic material, and the pressure reduction is further effective for this objective and for preventing oxidation of the bonding-destined surfaces.

Figure 7:
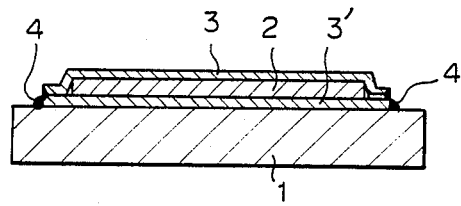

The cover steel-sheet 3' is welded to the cover steel-sheet 3 along their four peripheral ends (FIG. 6) and is subsequently welded to the base material 1, as is shown in FIG. 7. The welding of the cover steel sheet 3' and base metal 1 may be carried out in any sequence other than that shown in FIGS. 6 and 7, which however at most facilitates the welding operation and maintains the cleanliness of bonding-destined surfaces.

Figure 8:
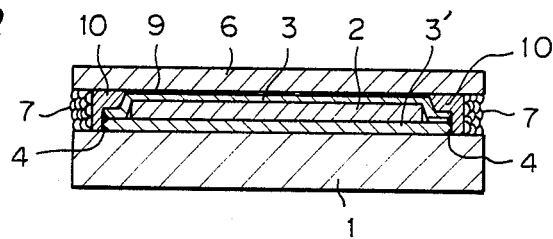

Referring to FIG. 8, the separating agent 9 is disposed on the cover steel-sheet 3 and the warp-preventing material 6 is overlaid on the cover steel-sheet 3 via the separating agent 9. The separating agent 9 is the same as that described hereinabove. The warp-preventing material 6 and the base material 1 are welded (7) to one another along the four peripheral ends thereof. Between the four peripheral welding parts (7) and the cladding and cover materials are interposed distant pieces 10, which completely shield the cladding and cover materials from a detrimental influence of the four end peripheral welding (7).

(9) The clad plate obtained by hot-rolling may be further hot-rolled. In this case, the clad plate, to which the cover material is still attached, is reheated and rolled, thereby preventing oxidation loss and quality deterioration of the cladding material, which is expensive.

Figure 10:
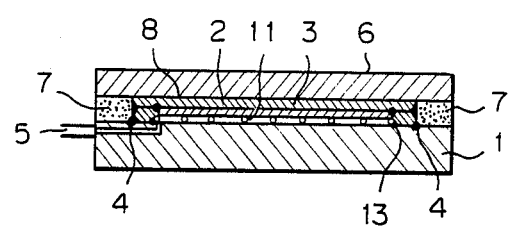
FIGS. 10 through 12 illustrate an embodiment of the present invention in which reinforcing material in the form of a net is sandwiched between the cladding material and base material, in which three drawings show the completed assembly.
Figure 11:
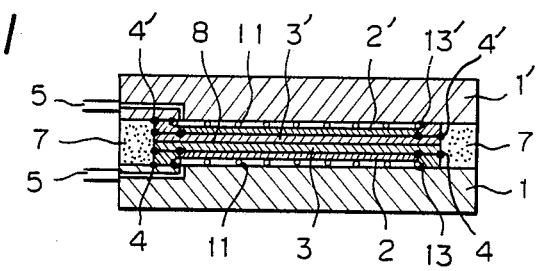
Figure 12:
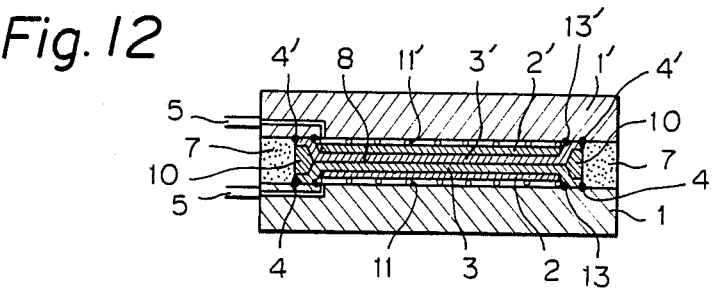

(10) According to the present invention, reinforcing material 11 in the form of a net may be inserted between the base material 1 and cladding material 2, thereby obtaining a multi-layered structure as shown in FIG. 10. As is shown in FIGS. 10 through 12, the base material 1, the reinforcing material 11, the cladding material 2, and the cover material 3 are joined after their joining surfaces are cleaned. The reinforcing material 11 and the cover material 3 are welded (13) with one another along their periphery. The cladding material 2 is fixed by the welded, reinforcing material 11 and cover material and is sealed between the base material 1 and the cover material 3. The warp-preventing material 6 is overlaid upon the cover material 3 and is welded (7) with the base material 1. Instead of using the warp-preventing material 6 exclusively for the purpose of warp prevention as shown in FIG. 10, a multi-layer structure as shown in FIG. 10 but not having the layer 6, i.e., the multi-layer structure of base material 1', reinforcing material 11' in the form of a net, the cladding material 2', and the cover material 3', can be used for preventing warp of the other multi-layer structure, as shown in FIGS. 11 and 12. In this case, a pair of multi-layer structures having the identical structure are assembled to form a blank for rolling. The nets of reinforcing materials 11, 11' form passages, during assembling of a pair of multi-layered structures. The inert gas is blown through the passages so as to prevent welding contamination at the initial period of welding. When the gas pressure at the bonding-destined surfaces is to be reduced after to the welding, the gases are exhausted through the passages. The passages therefore ensure that conditions for enhancing the bonding strength can be realized.

Since the periphery of the reinforcing materials 11, 11' is fixed to the base material 1, the reinforcing materials 11, 11' are forced to engage into the base materials 1, 1' and cladding materials 2, 2' by the initial light rolling, thereby determining the lateral position of the cladding materials 2, 2' relative to the base materials 1, 1'. When the rolling proceeds further, the base materials 1, 1' and the cladding materials 2, 2' are directly bonded to one another at portions thereof exposed through the net wires of the reinforcing materials 11, 11', and they (1, 1', 2, 2') are bonded via the net wires at the other portions. The bonding boundary between three kinds of materials 1 (1'), 2 (2'), and 11 (11') exhibits a wave form having geometrically a destruction stopping effect. The bonding property attained by the three kinds of materials 1 (1'), 2 (2'), and 3 (3') can be higher than that attained by the direct bonding of the base material and the cladding material, when the reinforcing materials 11, 11' are appropriately selected so as to function as bonding-intermediary materials. When the reinforcing materials 11, 11' have a higher deformation resistance at rolling than the deformation resistance of the base materials 1, 1' and the cladding materials 2, 2', the deformation amount of the cladding materials 2, 2', relative to that of the base materials 1, 1' can be kept to a minimum, so that the thickness deviation (the maximum thickness-the minimum thickness) of a clad plate after rolling can be lessened and the dimensional accuracy can be enhanced.

(11) According to a method of the present invention, in which the functions of reinforcing materials 11, 11' in the form of a net are most fully utilized, the amount of roll reduction (the thickness prior to the rolling—the thickness after the rolling) is greater than a half of the total thickness of the reinforcing material(s) in the form of a net and is 10% or less of the thickness of the multi-layer structure, with regard to the first rolling. This amount of roll reduction is considerably lower than that in the ordinary plate rolling. By rolling with the above mentioned amount of roll reduction, the reinforcing materials 11, 11' are forced to engage with the base materials 1, 1' and the cladding materials 2, 2' and the gap between these materials 1, 1' and 2, 2' is caused to disappear by at least two passes. Subsequently, the rolling with an ordinary or even greater amount of roll reduction is carried out. Relative slip between the base materials 1, 1' and cladding materials 2, 2' does not occur during the subsequent rolling with an ordinary or great screw down, because the initial rolling is carried out. The initial rolling is not intended to decrease the thickness of a workpiece but is intended to prevent the relative slip between the base materials 1, 1' and the cladding materials 2, 2'. The passes of the first rolling, therefore, do not exceed 10% of the blank for rolling. It is desirable for keeping the thickness deviation within a small range, to carry out the reverse rolling with a first forward pass and a second reverse pass, both having the identical amount of reduction, thereby realizing a virtually symmetrical deformation in the forward and backward directions.

(12) The reinforcing material in the form of a net, as used in the present invention, desirably exhibits, at the rolling temperature, a higher deformation resistance than at least one of the base material and cladding material. When the base material is steel or its alloy, and the cladding material is stainless steel, iron-, nickel-, or cobalt-based superalloy, titanium or its alloy, zirconium or its alloy, or copper or its alloy, the reinforcing material can be stainless steel, or, though expensive, one of the above superalloys.

(13) The heating temperature for rolling according to the present invention is selected to the $A_1$ transformation point of steel or higher, i.e., 726° C. or higher, thereby making it possible to utilize the transformation heat during rolling and to keep the temperature change small during the rolling. The rolling is then carried out in such a manner that the temperature varies around the transformation point. According to the heating and rolling method as above, the variation in the deformation resistance due to a nonuniform temperature can be lessened, and hence the dimensional accuracy of a clad steel-plate obtained by rolling can be enhanced.

(14) When the rolled, clad steel-plate is cooled down to a temperature lower than the $Ar_1$ transformation point, the transformation occurs during the cooling, which may result in a warp of the rolled, clad steel-plate. The last rolling pass is preferably determined to be less than the $A_1$ transformation point, thereby enabling a straightening or correction of the warp which is likely to occur during the $A_1$ transformation, and also to prevent warp generation during cooling.

When the rolling-bonding is completed, a clad plate is subjected to a compulsory cooling to a temperature where the diffusion speed is satisfactorily low, i.e., 650° C., or lower, to suppress the diffusion across the bonding boundary to a diffusion amount as small as possible. Since, during the compulsory cooling warp is likely to occur, this procedure should be carried out while repeating the straightening.

When the steel materials are to be separated from one another and the separation at the inter-steel materials is to be promoted, an at least one alternate pass of a correction or straightening operation is preferably carried out at a temperature region of blue brittleness, i.e., from 200° to 500° C., thereby enlarging the destruction at a part of the separation-destined surfaces to the entire surfaces.

The present invention is hereinafter described by way of examples.

EXAMPLE 1

Details of the methods for producing clad plates are given in Table 1.

In any of these methods, the materials other than the cladding material are 0.17% carbon steel. The assembled blanks are 150 mm in width and 200 mm in length. These blanks are sample having a small size but allowing an evaluation of the circumstance of the rolling in the commercial production scale. All of the blanks are MIG-welded, while blowing argon gas into the blanks to prevent welding contamination. When the welding is completed, the pressure within the blanks is reduced to $10^2$ torr. The heating temperature for rolling is 800° C. for all of the blanks.

TABLE 1

|  | Conventional | | Inventive Method | | | | |
|---|---|---|---|---|---|---|---|
|  | Method 1-1 | Method 1-2 | Method 1-3 | Method 1-4 | Method 1-5 | Method 1-6 | Method 1-7 |
| Base Material 1 | | | | | | | |
| (kind) | Steel | Steel | Steel | Steel | Steel | Steel | Steel |
| Thickness (mm) | 20 | 20 | 20 | 20 | 20 | 20 | 20 |
| Cladding Material 2 | | | | | | | |
| (kind) | SUS 304 | titanium | SUS 304 | brass | titanium | titanium | Ni—based Superalloy |
| Thickness (mm) | 6 | 6 | 6 | 6 | 6 | 6 | 6 |
| Cover Material 3 | | | | | | | |
| (kind) | — | — | Steel | Steel | Steel | Steel | Steel |
| Thickness (mm) | — | — | 2 | 2 | 2 | 2 | 2 |
| Warp-preventing material 4 | | | | | | | |
| (kind) | — | — | Steel | — | — | — | — |
| Thickness (mm) | — | — | 9 | — | — | — | — |
| Cover Material 3' | | | | | | | |
| (kind) | — | — | — | Steel | Steel | Steel | Steel |
| Thickness (mm) | — | — | — | 2 | 2 | 2 | 2 |
| Cladding Material 2' | | | | | | | |
| (kind) | — | titanium | — | brass | titanium | titanium | Ni—based Superalloy |
| Thickness (mm) | — | 4 | — | 4 | 4 | 4 | 4 |
| Base Material 1' | | | | | | | |
| (kind) | — | Steel | — | Steel | Steel | Steel | Steel |
| Thickness (mm) | — | 15 | — | 15 | 15 | 15 | 15 |
| Separating Material 9 | | | | | | | |
| (kind) | — | $SiO_2$ | $Al_2O_3$ | $Al_2O_3$ | iron oxide | $TiO_2$ | $Cr_2O_3$ |
| Thickness (μm) | — | 15 | 14 | 12 | 35 | 14 | 10 |
| Structure of Blank for Rolling | | | FIG. 3 | FIG. 4 | FIG. 4 | FIG. 5 | FIG. 5 |
| Total thickness of finishing rolled article (mm) | 6 | 11 | 8 | 12 | 12 | 12 | 12 |
| Warp during Rolling | Great | Medium | Small | Small | Small | Small | Medium |

TABLE 1-continued

|  | Conventional | | Inventive Method | | | | |
| --- | --- | --- | --- | --- | --- | --- | --- |
|  | Method 1-1 | Method 1-2 | Method 1-3 | Method 1-4 | Method 1-5 | Method 1-6 | Method 1-7 |
| Warp after Cooling | Great | Medium | Medium | Small | Small | Small | Medium |
| Thickness Deviation of a clad plate (mm) | 0.33 | 0.27 | 0.22 | 0.24 | 0.18 | 0.19 | 0.25 |
| Shear Strength of Base Material and Cladding Material (kgf/mm$^2$) | 16 | 3 | 37 | 19 | 24 | 28 | 31 |
| Test of Lateral Bending | Poor | Poor | Good | Good | Good | Good | Good |
| Comprehensive Evaluation | Poor | Poor | Good | Good | Good | Good | Good |

In the method 1.1 of the conventional method, a 6 mm thick stainless steel (JIS standard SUS304) is welded to a 20 mm thick base, steel material. In the method 1.1, a great warp toward the SUS304 side occurs during the rolling, the warp increases during cooling, and a thickness deviation (=maximum warp toward the SUS304 side occurs during the rolling, the warp increases during cooling, and a thickness deviation (=maximum thickness−minimum thickness) of a clad plate amounts to 0.33 mm, which is great. In the method 1.1, the shear strength is low and the result of a lateral bending test is poor.

In the method 1.2 of the conventional method, the blank has a multi-layer structure such as shown in FIG. 5 but does not have the cover materials 3, 3'. The shear strength is low, and in the method 1.2, the result of the lateral bending test is poor.

The blanks of the methods 1.3 through 1.7 according to the present invention have a structure according to one of FIGS. 3 through 5. The blanks are provided with a non-symmetrical structure so as to make the warp appreciable. The warp of the clad plates generated during rolling and cooling lies within a permissible range. In addition, the thickness variation of the clad plates, shear strength of the base material and cladding material, and the result of the lateral test are all excellent.

In the method 1.5, the separating agent is a 35 μm thick oxide scale which is preliminarily formed on the cover material, i.e., the steel sheet. In the other methods 1.3, 1.4, 1.6, and 1.7, the powder mainly composed of $Al_2O_3$, $TiO_2$, or $Cr_2O_3$ as given in Table 1 was applied on the steel sheet, utilizing silicone resin as the vehicle, and then dried to form a 10 μm or more thick coating. The separating agent can be easily separated from the clad plates after rolling. After rolling, the cover material, which bonds with the cladding material, is removed by means of grinding with a grinder.

According to the present invention, clad plates having a high dimensional accuracy and improved bonding strength can be produced. Provided that the cladding material and base material are weldable to one another, any combination of metals may be employed for forming a clad plate by either hot- or cold- rolling according to the present invention.

EXAMPLE 2

The details of the methods for producing clad plates are given in Table 2.

TABLE 2

|  | Conventional | | Inventive Method | |
| --- | --- | --- | --- | --- |
|  | Method 2-1 | Method 2-2 | Method 2-3 | Method 2-4 |
| Base Material 1 | | | | |
| (kind) | Steel | Steel | 0.17% carbon steel | 0.17% carbon steel |
| Thickness (mm) | 20 | 20 | 20 | 20 |
| Cladding Material 2 | | | | |
| (kind) | SUS 304 | titanium | SUS 304 | titanium |
| Thickness (mm) | 6 | 6 | 6 | 6 |
| Cover Material 3 | | | | |
| (kind) | — | — | 0.01% carbon steel | 0.01% carbon steel |
| Thickness (mm) | — | — | 1 | 1 |
| Warp-preventing material 7 | | | | |
| (kind) | — | — | Steel | — |
| Thickness (mm) | — | — | 20 | — |
| Cover Material 3' | | | | |
| (kind) | — | — | 0.01% carbon steel | 0.01% carbon steel |
| Thickness (mm) | — | — | 1 | 1 |
| Cladding Material 2' | | | | |
| (kind) | — | titanium | — | titanium |
| Thickness (mm) | — | 4 | — | 4 |
| Base Material 1' | | | | |
| (kind) | — | Steel | — | 0.17% carbon steel |
| Thickness (mm) | — | 15 | — | 15 |
| Separating Material 9 | | | | |
| (kind) | — | SiO$_2$ | SiO$_2$ | SiO$_2$ |
| Thickness (μm) | — | 15 | 15 | 15 |
| Structure of Blank for Rolling | | | FIG. 3 | FIG. 4 |
| Total thickness of finishing rolled article (mm) | 6 | 11 | 8 | 12 |

TABLE 2-continued

|  | Conventional | | Inventive Method | |
| --- | --- | --- | --- | --- |
|  | Method 2-1 | Method 2-2 | Method 2-3 | Method 2-4 |
| Warp during Rolling | Great | Medium | Small | Small |
| Warp after Cooling | Great | Medium | Small | Small |
| Thickness Deviation of a clad plate (mm) | 0.33 | 0.27 | 0.17 | 0.19 |
| Shear Strength of Base Material and Cladding Material (kgf/mm$^2$) | 16 | 3 | 42 | 31 |
| Test of Lateral Bending | Poor | Poor | Good | Good |
| Distribution Thickness of Carbide ($\mu$m) | 45 | 30 | 10 or less | 10 or less |
| Comprehensive Evaluation | Poor | Poor | Good | Good |

In any of these methods, the base steel material is 0.17%C-carbon steel, and the cover material is 0.01% ultra low-carbon steel. The assembled blanks are 150 mm in width and 200 mm in length. These blanks are samples having a small size but allowing an evaluation of the circumstance of the rolling in the commercial production scale. All of the blanks are MIG-welded, while blowing argon gas into the blanks to prevent welding contamination. When the welding is completed, the pressure within the blanks is reduced to $10^2$ torr. The heating temperature for rolling is 800° C. for all of the blanks.

In the method 2.1 of the conventional method, a 6 mm thick stainless steel (JIS standard SUS304) is fillet-welded with a 20 mm thick base, steel material. In the method 2.1, a great warp toward the SUS 304 side occurs during the rolling, the warp increases during cooling, and a thickness deviation (=maximum thickness—minimum thickness) of a clad plate amounts to 0.33 mm, which is great. In the method 2.1, the shear strength is low and the result of the lateral bending test is poor.

Figure 9:
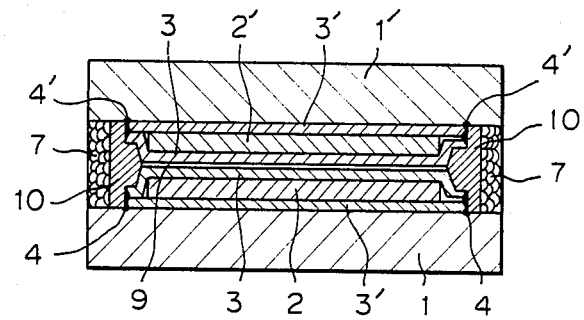

In the method 2.2 of the conventional method, the blank has a multi-layer structure such as shown in FIG. 9 but not having the cover materials 3, 3'. The shear strength is low, and in the method 2.2, the result of lateral bending test is poor.

The blanks of the methods 2.3 and 2.4 according to the present invention have a structure as shown in FIGS. 8 and 9, respectively. The blanks are provided with a nonsymmetrical structure to make the warp appreciable. The warp of the clad plates generated during rolling and cooling lies within a permissible range. In addition, the thickness variation of the clad plates, shear strength of the base material and cladding material, and the result of the lateral test are all excellent.

Figure 13:
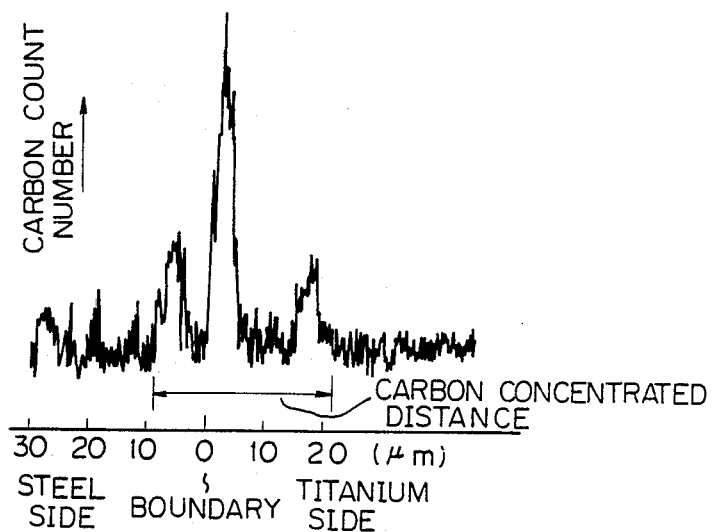
FIG. 13 illustrates the carbon concentrated distance.
Figure 14:
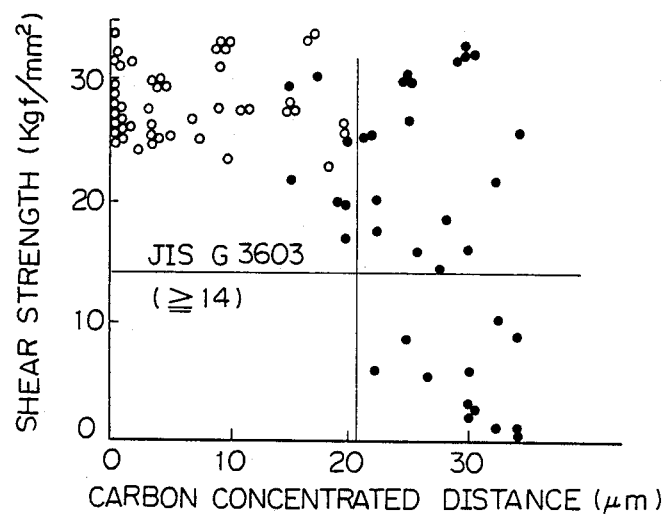
FIG. 14 illustrates an effect of the present invention by showing the relationship between the carbon concentrated distance and the shear strength.

The shear strength and testing result of the lateral bending have a relationship with the distribution thickness of carbides enriched in the vicinity of the bonding boundary. The carbides are mainly TiC when the cladding material is titanium or its alloy, and the carbides are mainly Cr$_7$C$_3$ and Cr$_{23}$C$_6$ when the cladding or cover material is stainless steel. The concentrated distance of carbides at the bonding boundary is measured by using an EPMA produced by Shimazu Seisakusho (model: EMX-SM), under the conditions: 20 kV acceleration voltage; 0.01 $\mu$A specimen-current; and, 1 $\mu$m beam diameter. The beam was displaced from the steel to titanium sides vertically across the bonding boundary, so as to obtain a linear analysis chart of the carbon, as shown in FIG. 13. The 0.5k counts of carbon correspond to the full scale of the recording paper of the EPMA. The distance, such as shown by the arrow in FIG. 13, of boundary where the carbon concentrates, is measured as the carbon concentrated distance. FIG. 14 shows the relationships between the shear strength measured by the method stipulated in JIS G 3603 and the carbon concentrated distance. The shear strength of 14 kgf/mm$^2$ or more stipulated in JIS G 3603 is accomplished at the carbon concentrated distance of 20 $\mu$m or less. Carbon concentrated in the bonding boundary of titanium and steel forms TiC enhances the shear strength when the TiC amount is trace. When TiC is formed in such a degree that the carbon concentrated distance exceeds 20 $\mu$m, embrittlement rather than strengthening occurs and, therefore, some of the clad plates exhibit a low shear strength.

The above described relationships between the shear strength and carbon-concentrated distance also conform to the clad plates, in which stainless steel is used as the cladding material or intermediate material. Cr$_7$C$_3$ and Cr$_{23}$C$_6$ are formed in this case and exert an influence on the shear strength as in the case for TiC.

According to the present invention, a clad steel having a high bonding strength can be produced while avoiding oxidation of the cladding material which is expensive. When the steel sheet used for cover material has a carbon content of 0.01% or less, the strength enhancement is outstanding for the clad plates, whose cladding material easily forms carbide, as do titanium or its alloy, zirconium, or stainless steel.

The assembling and welding of a blank according to the present invention is easy and inexpensive. In addition, the base material may be steel having a carbon content of 0.12% or more according to the present invention while stabilizing the test values of the shear strength at a high level. Contrary to this, the shear strength is low and greatly varies when the steel having a carbon content of 0.12% or more is used as the base material in the conventional methods.

EXAMPLE 3

Details of the methods for producing clad plates are given in Table 3.

In any of these methods, all of the cladding materials 1, 1', cover materials 4, 4' and warp-preventing material 6 are 0.17% carbon steel. The thickness of these materials are given in Table 3. The assembled blanks are 150 mm in width and 200 mm in length. These blanks are samples having a small size but allowing an evaluation of the circumstance of the rolling in the commercial production scale.

All of the blanks are MIG-welded, while blowing the argon gas into the blanks, to prevent welding contamination. When the welding is completed, the pressure within the blanks is reduced to $10^{-2}$ torr. The heating temperature for rolling is 800° C. for all of the blanks.

form of a net and the cover materials, all of the warp and thickness deviation of the clad plates, shear

TABLE 3

| | Conventional | | Inventive Method | | | | |
|---|---|---|---|---|---|---|---|
| | Method 3-1 | Method 3-2 | Method 3-3 | Method 3-4 | Method 3-5 | Method 3-6 | Method 3-7 |
| Base Material 1 | | | | | | | |
| (kind) | Steel | Steel | Steel | Steel | Steel | Steel | Steel |
| Thickness (mm) | 20 | 20 | 20 | 20 | 20 | 20 | 20 |
| Reinforcing Material (Net) 11 | | | | | | | |
| (kind) | — | — | SUS 430 | SUS 430 | SUS 430 | SUS 430 | SUS 430 |
| Wire Diameter (mm) | — | — | 0.6 | 0.6 | 0.6 | 0.6 | 0.6 |
| Mesh | — | — | 10 | 10 | 10 | 10 | 10 |
| Cladding Material 2 | | | | | | | |
| (kind) | SUS 430 | titanium | SUS 430 | brass | titanium | titanium | Ni—based Superalloy |
| Thickness (mm) | 6 | 6 | 6 | 6 | 6 | 6 | 6 |
| Cover Material 3 | | | | | | | |
| (kind) | — | — | Steel | Steel | Steel | Steel | Steel |
| Thickness (mm) | — | — | 2 | 2 | 2 | 2 | 2 |
| Warp-preventing Material 6 | | | | | | | |
| (kind) | — | — | Steel | — | — | — | — |
| Thickness (mm) | — | — | 9 | — | — | — | — |
| Cover Material 3' | | | | | | | |
| (kind) | — | — | — | Steel | Steel | Steel | Steel |
| Thickness (mm) | — | — | — | 2 | 2 | 2 | 2 |
| Cladding Material 3' | | | | | | | |
| (kind) | — | titanium | — | brass | titanium | titanium | Ni—based Superalloy |
| Thickness (mm) | — | 6 | — | 6 | 6 | 6 | 6 |
| Reinforcing Material (Net) 11' | | | | | | | |
| (kind) | — | — | SUS 430 | SUS 430 | SUS 430 | SUS 430 | SUS 430 |
| Wire Diameter (mm) | — | — | 0.6 | 0.6 | 0.6 | 0.6 | 0.6 |
| Mesh | — | — | 10 | 10 | 10 | 10 | 10 |
| Base Material 1' | | | | | | | |
| (kind) | — | Steel | — | Steel | Steel | Steel | Steel |
| Thickness (mm) | — | 20 | — | 20 | 20 | 20 | 20 |
| Separating Material 9 | — | $SiO_2$ | $Al_2O_3$ | $Al_2O_3$ | iron oxide | $TiO_2$ | $Cr_2O_3$ |
| Separating Material 9 Thickness (μm) | — | 12 | 12 | 13 | 35 | 12 | 15 |
| Structure of Blank for Rolling | | | FIG. 5 | FIG. 6 | FIG. 6 | FIG. 7 | FIG. 7 |
| Total thickness of finishing rolled article (mm) | 6 | 12 | 8 | 12 | 12 | 12 | 12 |
| Warp during Rolling | Great | Medium | Small | Small | Small | Small | Small |
| Warp after Cooling | Great | Medium | Small | Small | Small | Small | Medium |
| Thickness Deviation of a clad plate (mm) | 0.36 | 0.30 | 0.23 | 0.26 | 0.19 | 0.22 | 0.24 |
| Shear Strength of Base Material and Cladding Material (kgf/mm²) | 18 | 5 | 41 | 23 | 28 | 29 | 39 |
| Test of Lateral Bending | Poor | Poor | Good | Good | Good | Good | Good |
| Comprehensive Evaluation | Poor | Poor | Good | Good | Good | Good | Good |

In the methods 3.3 through 3.7 according to the present invention, reinforcing materials 11, 11' in the form of a net are inserted between the base materials 1, 1' and cover materials 2, 2'. The periphery of the reinforcing materials 11, 11' and the cover materials 3, 3' are fixed to the base materials 1, 1' by welding. In any of these methods, the reinforcing materials 11, 11' in the form of a net are SUS 430 stainless steel, whose deformation resistance during rolling is higher than any of 0.17% carbon steel, brass and titanium.

In the conventional method 3.1, the reinforcing materials in the form of a net are not used and the 6 mm thick SUS 430 stainless steel (cladding material) is directly welded to the 20 mm thick base steel material. In this method, a great warp toward the SUS 430 side occurs during the hot-rolling, the warp increases during cooling, and a thickness deviation and shear strength of the base material and cladding material are inferior to those obtained by the method 3.3 according to the present invention.

In the conventional method 3.2, since the blanks are assembled without using the reinforcing materials in the form of a net and the cover materials, all of the warp and thickness deviation of the clad plates, shear strength, and testing result of the lateral bending are inferior to those obtained by the methods 3.5 and 3.6 according to the present invention.

The blanks for rolling in the methods 3.4 through 3.7 have the same structures as shown in FIGS. 11 and 12. Any warp occurring during rolling or cooling is kept within a permissible range. In addition, the thickness deviation of the clad plates, shear strength of the base material and cladding material, and testing result of the lateral bending are excellent. In the method 3.7 according to the present invention, the separating agent is a 35 μm thick oxide scale preliminarily formed on one of the surfaces the steel sheets, i.e., the cover materials 4, 4'. In the other methods according to the present invention, the powder mainly composed of $Al_2O_3$, $TiO_2$, or $Cr_2O_3$ as given in Table 1 was applied on the steel sheet by utilizing silicone resin as the vehicle, and then dried to form a 10 μm or more thick coating. The separating agent can be easily separated from the clad plates after rolling. After rolling, the cover material, which bonds with the cladding material, is removed by means of grinding with a grinder.

As is understood from the present example, the clad plate according to the present invention, having a high bonding strength, can be produced by rolling. Furthermore the method according to the present invention can be applied generally for the production of a clad plate by plastic working. The cladding material clad on the base steel material may be stainless steel, iron-, nickel-, or cobalt-based superalloy, titanium or its alloy, aluminium or its alloy, and copper or its alloy. The method according to the present invention can be applied for the mill-rolling, forging, drawing, and dies-rolling methods which may be either a hot or cold-working method. The clad materials may have various shapes of sheet, tube, bar, rod, and others.

EXAMPLE 4

Details of the methods for producing clad plates are given in Table 4. In any of these methods, the materials other than cladding material is 0.18%C carbon steel.

through 4.5 as possible. The comparative methods 4.1 and 4.2 are therefore improved over the conventional method. In the comparative methods 4.1 and 4.2, the temperature of the final pass is higher than the $A_1$ transformation point, so that the warp becomes great after cooling due to the $A_1$ transformation occurring during cooling. The comparative methods 4.1 and 4.2 are inferior to the methods 4.3 through 4.5 according to the present invention, in which the final pass is carried out at a temperature lower than the $A_1$ transformation point (726° C.). The $A_1$ transformation, therefore, is virtually completed during the rolling and thus the warp occurrence during cooling is small. In addition, in the methods 4.3 through 4.5 according to the present invention, the $A_1$ transformation heat is utilized during rolling, and therefore, the temperature drop during cooling is small. The variation in the deformation resistance is therefore kept within a small range, thereby lessening the thickness deviation (=maximum thickness−minimum thickness) of the clad plates. Furthermore, in the methods 4.3 through 4.5 of the present invention, rapid cooling is

TABLE 4

|  | Comparative | | Inventive Method | | |
| --- | --- | --- | --- | --- | --- |
|  | Method 4-1 | Method 4-2 | Method 4-3 | Method 4-4 | Method 4-5 |
| Base Material 1 | | | | | |
| (kind) | Steel | Steel | Steel | Steel | Steel |
| Thickness (mm) | 150 | 150 | 150 | 150 | 150 |
| Cladding Material 2 | | | | | |
| (kind) | SUS 304 | titanium | SUS 304 | titanium | titanium |
| Thickness (mm) | 15 | 15 | 15 | 15 | 15 |
| Cover Material 3 | | | | | |
| (kind) | — | — | Steel | Steel | Steel |
| Thickness (mm) | — | — | 10 | 10 | 10 |
| Cover Material 3' | | | | | |
| (kind) | — | — | Steel | Steel | Steel |
| Thickness (mm) | — | — | 10 | 10 | 10 |
| Cladding Material 2' | | | | | |
| (kind) | SUS 304 | titanium | SUS 304 | titanium | titanium |
| Thickness (mm) | 15 | 15 | 15 | 15 | 15 |
| Base Material 1' | | | | | |
| (kind) | Steel | Steel | Steel | Steel | Steel |
| Thickness (mm) | 150 | 150 | 150 | 150 | 150 |
| Separating Material 9 | | | | | |
| (kind) | $SiO_2$ | $SiO_2$ | $SiO_2$ | $SiO_2$ | iron oxide |
| Film Thickness at Portion "A" (μm) | 20 | 50 | 10 | 20 | 10 |
| Film Thickness at Portion "B" (μm) | — | — | 0 | 5 | 0 |
| Structure of Blank for Rolling | C | C | FIG. 4 | FIG. 4 | FIG. 4 |
| Total thickness of finishing rolled article (mm) | 50 | 50 | 54 | 54 | 54 |
| Heating Temperature (°C.) | 1100 | 880 | 800 | 800 | 750 |
| Final Pass Temperature (°C.) | 960 | 780 | 710 | 705 | 690 |
| Starting Temperature of Straightening (°C.) | 930 | 760 | 700 | 690 | 680 |
| Finishing Temperature of Straightening (°C.) | 900 | 730 | 230 | 240 | 240 |
| Compulsory Cooling | no | no | yes | yes | yes |
| Warp during Rolling | Medium | Medium | Medium | Small | Small |
| Warp after Cooling | Great | Medium | Small | Small | Small |
| Thickness Deviation of a clad plate (mm) | 0.36 | 0.41 | 0.33 | 0.26 | 0.23 |
| Shear Strength of Base Material and Cladding Material (kgf/mm$^2$) | 34 | 6 | 46 | 30 | 33 |
| Test of Lateral Bending | Good | Poor | Good | Good | Good |
| Comprehensive Evaluation | Somewhat good | Poor | Good | Good | Good |

In the comparative methods 4.1 and 4.2, the blank for rolling is not provided with the cover material 3 but the inert gas-blowing during welding and the subsequent pressure-reduction are carried out under the conditions which are adjusted to be as identical to the methods 4.3 carried out after the rolling finishing, to suppress the diffusion across the bonding boundary, thus improving the shear strength and lateral bending. The means for suppressing the diffusion to the minimum level proposed herein greatly improves the bonding property of clad materials.

Although clad plates are described in the examples, tubes and rods can be also produced by the method according to the present invention. The base material must be steel when the $A_1$ transformation heat is to be utilized during the rolling. However the base material can be any material which undergoes transformation and generates transformation-heat during cooling. The cladding material may be any material having a melting point higher than the transformation point, e.g., the $A_1$ transformation point. For example, stainless steels, alloy steels and titanium or its alloy have a melting point higher than the $A_1$ transformation point.

We claim:

1. A method for producing a clad plate by rolling, said method comprising:
    forming a multi-layer structure by providing a cladding material between a base plate and an overlaying cover sheet after cleaning joining surfaces thereof;
    forming a multi-layer assembly by welding said cover sheet to said base plate along a periphery thereof, thereby sealing and fixing said cladding material between said cover sheet and said base plate;
    forming a blank for rolling by providing a separating agent between an outer surface of said cover sheet and an overlaying warp preventing plate, and fixing said warp preventing plate to said base plate by welding along a periphery thereof;
    hot rolling said blank, thereby producing a rolled article;
    cutting said rolled article along its periphery, thereby separating said warp preventing plate from said rolled article; and
    subsequently removing said cover sheet from said rolled article by at least one machining, grinding, and pickling of said cover sheet, thereby providing said clad plate.

2. A method according to claim 1 further comprising:
    blowing inert gas between said base plate and said cover sheet during said welding of said base plate to said cover sheet along the periphery thereof;
    thereafter maintaining said outer surface of said cover sheet at a temperature of 100° C. or higher and reducing pressure between said base plate and said cover sheet to $10^{-1}$ torr or less during said temperature maintenance and maintaining said temperature and said pressure until completing said forming of said blank by said welding of said base plate to said warp preventing plate.

3. A method according to claim 1 or 2 wherein said base plate and said cover sheet are carbon steel and said cladding material is one member selected from the group consisting of stainless steel, iron-based superalloy, nickel-based superalloy, cobalt-based superalloy, titanium, titanium alloy, zirconium, zirconium alloy, aluminum, aluminum alloy, copper, and copper alloy.

4. A method according to claim 3 wherein at least one said cladding material and said base plate consists of a plurality of layers.

5. A method according to claim 1 or 2 wherein said cover sheet and said warp preventing plate are steel materials, and said separating agent is an oxide layer having a thickness of 30 μm or more, said method further comprising:
    forming said oxide layer on a separation-destined surface of at least one of said cover sheet and said warp preventing plate;
    communicating said formed oxide layer with ambient air; and
    subjecting separation-destined surfaces of said cover sheet and said warp preventing plate to at least one alternating pass of leveler straightening at a work-hardening temperature of said steel materials.

6. A method according to claim 5 wherein said base plate and said cover sheet are carbon steel and said cladding material is one member selected from the group consisting of stainless steel, iron-based superalloy, nickel-based superalloy, cobalt-based superalloy, titanium, titanium alloy, zirconium, zirconium alloy, aluminum, aluminum alloy, copper and copper alloy.

7. A method according to claim 6 wherein at least one of said cladding material and said base plate consists of a plurality of layers.

8. A method according to claim 1 or 2 wherein said separating agent is a layer having a thickness of 10 μm or more, said method further comprising:
    forming said layer by applying a powder utilizing a vehicle of resin to at least one separation-destined surface selected from said cover sheet and said warp preventing plate, said powder being mainly composed of at least one member selected from the group consisting of $Al_2O_3$, $SiO_2$, $TiO_2$, $Cr_2O_3$, $Fe_2O_3$, and $Fe_3O_4$;
    communicating said formed layer with ambient air; and
    subjecting separation-destined surfaces of said cover sheet and said warp preventing plate to at least one alternating pass of leveler straightening at a work-hardening temperature of said cover sheet and said warp preventing plate.

9. A method according to claim 8 wherein said base plate and said cover sheet are carbon steel and said cladding material is one member selected from the group consisting of stainless steel, iron-based superalloy, nickel-based superalloy, cobalt-based superalloy, titanium, titanium alloy, zirconium, zirconium alloy, aluminum, aluminum alloy, copper and copper alloy.

10. A method according to claim 9 wherein at least one of said cladding material and said base material consists of a plurality of layers.

11. A method according to claim 1 or 2 wherein said cladding material is one member selected from the group consisting of titanium, titanium alloy, zirconium, zirconium alloy, and chromium-containing steel and said cover sheet is a carbon containing steel having a carbon content of 0.01% or less, said method further comprising:
    heating said blank to a temperature of 650° to 900° C., followed by said hot rolling of said blank.

12. A method according to claim 11 wherein after separating said warp preventing plate from said cover sheet resulting in a rolled product, said method further comprises:
    prior to said removing of said cover sheet, heating said rolled product and then further hot rolling said rolled product.

13. A method according to claim 1 or 2 further comprising:
    fixing a reinforcing material in the form of a net, having an original thickness, between said base plate and said cladding material after said cleaning of said joining surfaces thereof; and said step of welding said cover sheet to said base plate comprising bonding said cover sheet to said base plate by rolling while reducing the pressure at a bond-destined surface to $10^{-1}$ torr or less.

14. A method according to claim 13 wherein said base plate is one of steel and a steel alloy, said reinforcing material in the form of a net is stainless steel, said cladding material is one member selected from the group consisting of stainless steel, iron-based superalloy, nickel-based superalloy, cobalt-based superalloy, titanium, titanium alloy, zirconium, zirconium alloy, aluminum, aluminum alloy, copper and copper alloy.

15. A method according to claim 13 further comprising:
    initially rolling a three layer structure having an original thickness composed of said base plate, said cladding material, and said reinforcing material such that the thickness of said rolled three layer structure is greater than one half the original thickness of said reinforcing material in the form of a net and is 10% or less of the original thickness of said three layer structure.

16. A method according to claim 15 wherein said base plate is one of steel and a steel alloy, said reinforcing material in the form of a net is stainless steel, and said cladding material is one member selected from the group consisting of stainless steel, iron-based superalloy, nickel-based superalloy, cobalt-based superalloy, titanium, titanium alloy, zirconium, zirconium alloy, aluminum, aluminum alloy, copper, and copper alloy.

17. A method according to claim 1 or 2 wherein said base plate is steel, said method further comprising:
    heating said blank to a temperature higher than the $A_1$ transformation point of steel prior to said hot rolling of said blank and then performing said hot rolling of said blank, finishing a final hot rolling pass at a temperature less than the $A_1$ transformation point;
    cooling said rolled article to a temperature of 650° C. or less and during said cooling, subjecting said rolled article to a force acting against warp thereof.

18. A method according to claim 17 wherein said warp preventing plate is steel, said method further comprising: subjecting said rolled article, after said hot rolling, to at least one alternating straightening operation at a temperature range of from 200° to 500° C.

19. A method for producing clad plates by rolling, said method comprising:
    forming a first multi-layer structure by providing a first cladding material between a first base plate and a first overlaying cover sheet after cleaning joining surfaces thereof;
    forming a first multi-layer assembly by welding said first cover sheet to said first base plate along a periphery thereof, thereby sealing and fixing said first cladding material between said first cover sheet and said first base plate;
    forming a second multi-layer structure by providing a second cladding material between a second base plate and a second overlaying cover sheet after cleaning joining surfaces thereof;
    forming a second multi-layer assembly by welding said second cover sheet to said second base plate along a periphery thereof, thereby sealing and fixing said second cladding material between said second cover sheet and said second base plate;
    forming a blank for rolling by overlaying said first cover sheet of said first multi-layer assembly over the second cover sheet of said second multi-layer assembly and by providing a separating agent between said first cover sheet and said second cover sheet and by welding said first base plate to said second base plate along a periphery thereof, wherein said first and second base plates function to prevent warp;
    hot rolling said blank to produce a rolled article;
    cutting said rolled article along its periphery, thereby separating said first multi-layer assembly from said second multi-layer assembly along said separating agent between said first and second cover sheets; and
    removing said first and second cover sheets from their respective multilayer assemblies by at least one machining, grinding, and pickling of said first and second cover sheets thereby providing said clad plates.

20. A method according to claim 19 further comprising:
    blowing an inert gas between said respective base plates and cover sheets during said welding of said respective base plates and cover sheets along the periphery thereof;
    thereafter maintaining the outer surface of each cover sheet at a temperature of 100° C. or higher and reducing pressure between respective base plates and cover sheets to $10^{-1}$ or less during said temperature maintenance and maintaining said temperature and said pressure until completing said forming of said blank by said welding of said first base plate to said second base plate.

21. A method according to claim 19 or 20 wherein said base plates and said cover sheets are carbon steel and said cladding materials are one member selected from the group consisting of stainless steel, iron-based superalloy, nickel-based superalloy, cobalt-based superalloy, titanium, titanium alloy, zirconium, zirconium alloy, aluminum, aluminum alloy, copper and copper alloy.

22. A method according to claim 21 wherein at least one of said cladding materials and said base plates consist of a plurality of layers.

23. A method according to claim 19 or 20 wherein said cover sheets and said base plates are steel materials and said separating agent is an oxide layer having a thickness of 30 μm or more, said method further comprising:
    forming said oxide layer on at least one separation-destined surface of said cover sheets;
    communicating said formed oxide layer with ambient air;
    subjecting separation-destined surfaces of said cover sheets to at least one alternating pass of leveler straightening at a work-hardening temperature of said cover sheets.

24. A method according to claim 23 wherein said base plates and said cover sheets are carbon steel and said cladding materials are one member selected from the group consisting of stainless steel, iron-based superalloy, nickel-based superalloy, cobalt-based superalloy, titanium, titanium alloy, zirconium, zirconium alloy, aluminum, aluminum alloy, copper, and copper alloy.

25. A method according to claim 24 wherein at least one of said cladding materials and said base materials consist of a plurality of layers.

26. A method according to claim 19 or 20 wherein said separating agent is a layer having a thickness of 10 μm or more, said method further comprising:

forming said layer by applying a powder utilizing a vehicle of resin to at least one separation-destined surface of said cover sheets, said powder being mainly composed of at least one member selected from the group consisting of $Al_2O_3$, $SiO_2$, $TiO_2$, $Cr_2O_3$, $Fe_2O_3$, and $Fe_3O_4$;

communicating said formed layer with ambient air; and subjecting separation-destined surfaces of said cover sheets to at least one alternating pass of leveler straightening at a work-hardening temperature of said cover sheets.

27. A method according to claim 26 wherein said base plates and said cover sheets are carbon steel and said cladding materials are one member selected from the group consisting of stainless steel, iron-based superalloy, nickel-based superalloy, cobalt-based superalloy, titanium, titanium alloy, zirconium, zirconium alloy, aluminum, aluminum alloy, copper, and copper alloy.

28. A method according to claim 26 wherein at least one of said cladding materials and said base plates consist of a plurality of layers.

29. A method according to claim 19 or 20 wherein said cladding materials are one member selected from the group consisting of titanium, titanium alloy, zirconium, zirconium alloy, and chromium containing steel, and said cover sheets are carbon steel having a carbon content of 0.01% or less, said method further comprising:

heating said blank to a temperature of 650° to 900° C. followed by said hot rolling of said blank.

30. A method according to claim 29 wherein after separating said rolled first and second multi-layer assemblies, said method further comprising:

prior to removing said cover sheets, heating said rolled first and second multi-layer assemblies and then further hot rolling said rolled first and second multi-layer assemblies.

31. A method according to claim 19 or 20 further comprising:

fixing a reinforcing material in the form of a net having an original thickness between respective base plates and cladding materials after cleaning joining surfaces thereof; and said step of welding said respective cover sheets to said respective base plates comprises bonding respective cover sheets to respective base plates by rolling while reducing pressure at bond-destined surfaces to $10^{-1}$ torr or less.

32. A method according to claim 31 wherein said base plates are one of steel and steel alloy, said reinforcing material in the form of a net is stainless steel, and said cladding materials are one member selected from the group consisting of stainless steel, iron-based superalloy, nickel-based superalloy, cobalt-based superalloy, titanium, titanium alloy, zirconium, zirconium alloy, aluminum, aluminum alloy, copper and copper alloy.

33. A method according to claim 31 further comprising:

initially rolling at least one three layer structure each having an original thickness and being composed of one of said base plates, one of said cladding materials and one of said reinforcing materials such that the thickness of said at least one rolled three layer structure is greater than one-half the original thickness of its reinforcing material in the form of a net and is 10% or less of the original thickness of said three layer structure.

34. A method according to claim 33 wherein said base plates are one of steel and steel alloy, said reinforcing material in the form of a net is stainless steel, and said cladding materials are one member selected from the group consisting of stainless steel, iron-based superalloy, nickel-based superalloy, cobalt-based superalloy, titanium, titanium alloy, zirconium, zirconium alloy, aluminum, aluminum alloy, copper and copper alloy.

35. A method according to claim 19 or 20 wherein said base plates are steel, said method further comprising:

heating said blank to a temperature higher than the $A_1$ transformation point of steel prior to said hot rolling of said blank and then performing said hot rolling of said blank, finishing a final hot rolling pass at a temperature less than the $A_1$ transformation point;

cooling said rolled article to a temperature of 650° C. or less and during said cooling, subjecting said rolled article to a force acting against warp thereof.

36. A method according to claim 35 further comprising:

subjecting said rolled article, after said hot rolling, to at least one alternating straightening operation at a temperature range of from 200° to 500° C.

* * * * *